(12) United States Patent
Guagnarini et al.

(10) Patent No.: US 9,279,056 B2
(45) Date of Patent: Mar. 8, 2016

(54) ROAD SURFACE MIX

(71) Applicant: CORES SOCIETA' COOPERATIVA, Stroncone (IT)

(72) Inventors: Alfio Guagnarini, Orte (IT); Alessandro Ursini, Terni (IT)

(73) Assignee: CORES SOCIETA'COOPERATIVA, Stroncone (TR) (IT)

( * ) Notice: Subject to any disclaimer, the term of this patent is extended or adjusted under 35 U.S.C. 154(b) by 86 days.

(21) Appl. No.: 14/221,945

(22) Filed: Mar. 21, 2014

(65) Prior Publication Data

US 2014/0296412 A1    Oct. 2, 2014

(30) Foreign Application Priority Data

Mar. 27, 2013 (IT) ............................. AN2013A0064

(51) Int. Cl.

| | |
|---|---|
| *C08L 23/06* | (2006.01) |
| *C08L 23/08* | (2006.01) |
| *C08L 95/00* | (2006.01) |
| *C09D 7/12* | (2006.01) |
| *C08L 91/06* | (2006.01) |
| *C08L 23/04* | (2006.01) |
| *C08K 3/00* | (2006.01) |
| *C08K 3/26* | (2006.01) |
| *E01C 7/30* | (2006.01) |

(52) U.S. Cl.

CPC ............... *C09D 7/1233* (2013.01); *C08L 23/04* (2013.01); *C08L 91/06* (2013.01); *C09D 7/1216* (2013.01); *C08K 3/0033* (2013.01); *C08K 3/26* (2013.01); *C08L 2205/02* (2013.01); *E01C 7/30* (2013.01)

(58) Field of Classification Search

CPC ..... C08L 23/06; C08L 23/04; C08L 23/0846; C08L 23/0853; C08L 23/0869; C08L 2205/02; C08L 95/00; C08K 3/0033; C08K 3/26; C08K 2003/265; E01C 7/30

See application file for complete search history.

(56) References Cited

FOREIGN PATENT DOCUMENTS

| | | | | |
|---|---|---|---|---|
| CN | 101016436 A | | 8/2007 | |
| CN | 101205373 A | * | 6/2008 | |
| FR | WO 2010128105 A1 | * | 11/2010 | ............... C08F 8/42 |
| NL | 1097969 A1 | * | 5/2001 | ............. C04B 26/26 |
| SU | 767066 B | * | 9/1980 | |

* cited by examiner

*Primary Examiner* — Karuna P Reddy

(74) *Attorney, Agent, or Firm* — Egbert Law Offices, PLLC

(57) ABSTRACT

A road surface mix includes a solid inert material and a transparent binder able to bind the solid inert material and make it visible so that, in view of the transparency of the binder, the resulting compact mass takes the color of the solid inert material and is therefore integrated easily in special valuable settings. The transparent binder includes an ethylene copolypmer and an ethylene polymer and/or oils mixed in such manner that the transparent binder has a viscosity of 800-16000 cps at a temperature of 130-180° C.

3 Claims, No Drawings

ROAD SURFACE MIX

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present patent application for industrial invention relates to a mix used for road surfaces or external pavements. More specifically, the present invention relates to a mix of chemical products with high viscosity that are hot-mixed with crushed stone or other solid inert materials (fillers). Once it cools down, the solid materials are bound and form a compact mass (mix) provided with suitable structural characteristics to withstand vehicular traffic.

2. Description of Related Art Including Information Disclosed Under 37 CFR 1.97 and 37 CFR 1.98.

Road surface mixes are known on the market, in which the base of the binder is bitumen or bitumen modified with different materials. The common characteristic of these binders is the black color. The black color is taken by the mass of the bituminous mix. Consequently, the natural color of the crushed stone used in the mix is not visible.

Bituminous mixes have a very bad aesthetic impact, especially in town centers and areas of historical and environmental interest.

CN101016436 discloses a road mark paint that comprises EVA and polyethylene wax, with inert materials, such as calcium carbonate.

BRIEF SUMMARY OF THE INVENTION

The purpose of the present invention is to remedy the drawbacks of the prior art, by providing a road surface mix with high aesthetic and environmental qualities, which is able to make the crushed stone or other inert materials used in the road surface mix visible.

Another purpose of the present invention is to disclose a road surface mix that is reliable and at the same inexpensive, simple to make and lay.

These purposes are achieved according to the invention with the characteristics claimed in independent claim 1.

Advantageous embodiments appear from the dependent claims.

DETAILED DESCRIPTION OF THE INVENTION

The road surface mix of the invention comprises:
a solid inert material (A); and
a transparent binder (B) able to bind the solid inert material and make it visible.

In view of the transparency of the binder (B), the compact mass takes the color of the solid inert material (A) and therefore integrates easily in special valuable settings.

The solid inert material (A) is preferably crushed stone, having the natural color typical of crushed stone.

The transparent binder (B) is added to the mix in weight percentage from 3% to 15% with respect to the total weight of the mix, according to the granulometric distribution and nature of the solid inert material (A).

The mix temperature of the solid inert material (A) with the transparent binder (B) is comprised between 130° C. and 180° C.

The transparent binder (B) can have a viscosity ranging from 800 cps to 16000 cps at processing conditions, i.e. at a temperature of 130° C.-180° C. Preferably, the transparent binder (B) has a high viscosity, for example ranging from 8000 to 16000 cps.

The range of viscosity 8000 to 16000 cps has been selected after experimental tests. As matter of fact, binders having viscosity less than 8000 cps do not allow a sufficient cohesion strength with the solid inert material. On the contrary binders having viscosity more than 16000 cps do not allow an adsorption of the binder into the solid particles of the inert material and the adhesion of the solid particles of the inert material has worsened.

The transparent binder (B) can bind crushed stone of different type with highly variable granulometric distributions, without impairing the characteristics of the final product (mix).

Not having a dominant color, the mix of the invention can produce mixes with different colors that can integrate in natural landscapes or old buildings.

The transparent binder (B) comprises:
an ethylene copolymer (B1);
an ethylene polymer (B2) and/or oils (B3).

The chemical reaction between the ethylene copolymer (B1) and the ethylene polymer (B2) and/or the oils (B3) contributes to generating bindings suitable to bind with the solid inert material (A), such as crushed stone, in the transparent binder (B).

The ethylene copolymer (B1) has a weight percentage of 3-35% with respect to the total weight of the transparent binder (B). Instead, the weight percentages of the ethylene polymer (B2) and the oils (B3) change according to the type of ethylene polymer used. It is important that the transparent binder (B) has a viscosity of 800-16000 cps at a temperature of 130-180° C.

The ethylene copolymer (B1) comprises:
an ethylene-vinyl acetate copolymer (EVA); and/or
an ethylene-butyl acrylate copolymer (EBA).

The ethylene-vinyl acetate copolymer (EVA) has the characteristics shown in table 1 below:

TABLE 1

| (EVA) | | Range | Typical value |
|---|---|---|---|
| Vinyl acetate contents | % weight | 33-39 | 36 |
| Melt index | g/10 m | 45-60 | 50 |
| Peak melt temperature | ° C. | 47-59 | 55 |

The ethylene-butyl acrylate copolymer (EBA) has the characteristics shown in table 2 below:

TABLE 2

(EBA)

|  |  | Range | Typical value |
|---|---|---|---|
| Butyl acrylate contents | % weight | 3-37 | 34 |
| Melt index | g/10 m | 35-45 | 40 |
| Peak melt temperature | ° C. | 47-59 | 55 |
| Softening point (Vicat) (1 Kg) |  |  |  |

The ethylene polymer (B2) comprises:
amorphous polyethylene (PE) (soft wax) and/or
crystalline polyethylene (PE) (hard wax).

The amorphous polyethylene has the characteristics shown in table 3 below:

TABLE 3

(Amorphous PE)

|  | RANGE | TYPICAL VALUE |
|---|---|---|
| Molecular weight average (high) | 200000-400000 | 35000 |
| Molecule configuration | Many ramifications |  |
| No. of ramifications | 8-40 | 30 |
| Melt index (g/10 m) | 200-500 | 350 |
| Molecular weight distribution | Wide |  |

The crystalline polyethylene has the characteristics shown in table 4 below:

TABLE 4

(Crystalline PE)

|  | RANGE | TYPICAL VALUE |
|---|---|---|
| Molecular weight average (low) | 20000-60000 | 35000 |
| Molecule configuration | Few ramifications |  |
| No. of ramifications | 2-7 | 5 |
| Melt index (g/10 m) | 400-700 | 600 |
| Molecular weight distribution | Narrow |  |

A mix of synthetic/paraffin based mineral oils (B3) with the characteristics shown in table 5 below is preferably used:

TABLE 5

(OILS)

|  |  | RANGE | TYPICAL VALUE |
|---|---|---|---|
| Paraffin contents | % in weight | 5-20 | 10 |
| Melt index | g/10 m | 300-600 | 500 |
| Inflammability point | ° C. | 190-230 | 220 |

Advantageously, in order to increase viscosity, the transparent lubricant can comprise Petrolatum, which is a mix of aliphatic hydrocarbons with oil and paraffin base. The petrolatum characteristics are shown in table 6 below:

TABLE 6

(Petrolatum)

|  |  | RANGE | TYPICAL VALUE |
|---|---|---|---|
| Paraffin contents | % in weight | 5-10 | 8 |
| Oil contents | % in weight | 2-7 | 5 |
| Melt index | (g/10 m) | 300-700 | 450 |

The transparent lubricant can also comprise an inert filler, such as Calcium Carbonate.

If no oil is used, or if a low quantity of oils (B3) with a weight percentage lower than 5% with respect to the weight of the binder (B) is used, in order to obtain the desired viscosity, the ethylene polymer (B2) must contain a high percentage of amorphous PE (soft wax), higher than 50% with respect to the weight of the binder (B). In such a case, the ethylene polymer (B2) preferably comprises amorphous PE in weight percentage from 58 to 65% with respect to the weight of the transparent binder (B) and crystalline PE in weight percentage from 10 to 25% with respect to the weight of the transparent binder (B).

In such a case, the transparent binder (B) comprises:
amorphous PE in weight percentage from 58% to 65% with respect to the total weight of the transparent binder (B);
crystalline PE in weight percentage from 10% to 25% with respect to the total weight of the transparent binder (B);
EVA in weight percentage from 3% to 7% with respect to the total weight of the transparent binder (B);
EBA and/or oils (B3) in weight percentage from 5% to 25% with respect to the total weight of the transparent binder (B).

For illustrative purposes, a specific example of a formulation of the transparent binder according to the present invention with low oil contents is given below.

EXAMPLE 1

Binder with Low Oil Contents

|  | RANGE | Typical value |
|---|---|---|
| AMORPHOUS PE | 58-65% | 65% |
| CRYSTALLINE PE | 10-25% | 25% |
| EVA | 3-7% | 5% |
| EBA | 0-20% | 0% |
| OIL | 0-5% | 5% |
| Filler (CaCO$_3$) | 0-20% | 0% |

In such a case, the sum of EVA, EBA and oil must not be lower than 10%. In fact, EVA and EBA are the only copolymer components contained in all formulations and, as such, they need a suitable solvent to be dissolved and homogenized. If the solvent is OIL, if the sum of OIL, EVA and EBA is lower than 10%, the solvent cannot disperse the polymer in its matrix, and therefore dissolution and homogenization do not occur.

EVA is an essential component and must necessarily used, preferably with a percentage of 5%. The reason is that, when it is bound with polymers with low molecular weight, and particularly with AMORPHOUS PE, EVA provides adhesiveness, which is an essential property for a product to be used for mixes, in which the binder must aggregate the inert materials perfectly.

Evidently, the more adhesive the binder is, the easier the aggregation will be. It has been tested that the "best" EVA percentage is 5% because beyond such a value the product becomes too sticky, impairing its workability. On the contrary, under such a value, the product is not adhesive at all.

Instead, a different formulation has been devised if the transparent binder (B) contains high quantities of oil, for instance higher than 30%.

The transparent binder (B) comprises:
oils (B3) in weight percentage from 30 to 45% with respect to the total weight of the transparent binder (B);

EVA in weight percentage from 25% to 35% with respect to the total weight of the transparent binder (B);

crystalline PC and/or petrolatum in weight percentage from 0% to 50% with respect to the total weight of the transparent binder (B).

For illustrative purposes, a specific example of a formulation of the transparent binder according to the present invention with high oil contents is given below.

EXAMPLE 2

Binder with High Oil Contents

|  | RANGE | Typical value |
|---|---|---|
| OIL | 30-45% | 45% |
| EVA | 25-35% | 30% |
| CRYSTALLINE PE | 0-20% | 15% |
| PETROLATUM | 0-30% | 0% |
| Filler ($CaCO_3$) | 0-20% | 10% |

In example 2, compared with example 1, in order to maintain the desired viscosity, a higher quantity of EVA is used and AMORPHOUS PE is replaced with Oil and/or Petrolatum.

The sum of Crystalline PE and Petrolatum must not be lower than 10%. If the sum is lower than 10%, the viscosity of the binder is too high and this complicates, if not prevents, the workability of the final mix. In fact, CRYSTALLINE PE and PETROLATUM not only work as solvent, but also as diluent.

In such a case, EVA is an essential component and must necessarily used, preferably with a percentage of 30%. In order to improve the elasticity of the binder, EVA has been increased to the indicated levels, so that the mix obtained with such a binder has a higher resistance to mechanical stress. Such mechanical resistance is given by the EVA copolymer.

If EVA is included in a percentage lower than 30%, the binder is fragile and not sufficiently elastic. Moreover, the absence of AMORPHOUS PE (see formulation 1), which dramatically reduces the adhesiveness of the compound, requires to increase EVA to the given values.

Variations and modifications can be made to the present embodiments of the invention, within the reach of an expert of the field, while still falling within the scope of the invention.

We claim:

1. A road surface mixture comprising:
a solid inert material;
a transparent binder comprising:
amorphous polyethylene having a weight percent of between 58% and 65% with respect to a total weight of said transparent binder;
crystalline polyethylene having a weight percent between 10% to 25% with respect to the total weight of said transparent binder;
ethylene-vinyl acetate copolymer having a weight percent of between 3% to 7% with respect to the total weight of the transparent binder;
total of ethylene-butyl acrylate copolymer and/or oil having a weight percent of between 5% to 25% with respect to the total weight of the transparent binder;
wherein said amorphous polyethylene, said crystalline polyethylene, said ethylene-vinyl acetate copolymer and said ethylene-butyl acrylate copolymer and/or oil are mixed such that said transparent binder has a viscosity of between 8000 and 16000 cp at a temperature of between 130° C. and 180° C., said transparent binder is able to bind said solid inert material so as to form a compact mass and such that said solid inert material is visible through said transparent binder.

2. The road surface mixture of claim 1, said transparent binder being between 3% and 15% with respect to a total weight of the road surface mixture.

3. The road surface mixture of claim 1, said solid inert material being crushed stone.

\* \* \* \* \*